US012790870B2

(12) United States Patent
Jetzinger et al.

(10) Patent No.: US 12,790,870 B2
(45) Date of Patent: Nov. 10, 2026

(54) DEVICE AND METHOD FOR RECOGNIZING A MOVEMENT OF AN OBJECT CAUGHT IN A DOOR OF A VEHICLE, AND DETECTION SYSTEM

(71) Applicant: KNORR-BREMSE GESELLSCHAFT MIT BESCHRÄNKTER HAFTUNG, Mödling (AT)

(72) Inventors: Peter Jetzinger, Enns (AT); Thomas Hirtenlehner, Wolfsbach (AT); Helmut Schaffer, Ungenach (AT); Daniel Weinbergmair, Behamberg (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 237 days.

(21) Appl. No.: 18/285,231

(22) PCT Filed: Mar. 30, 2022

(86) PCT No.: PCT/EP2022/058446
§ 371 (c)(1),
(2) Date: Sep. 29, 2023

(87) PCT Pub. No.: WO2022/207723
PCT Pub. Date: Oct. 6, 2022

(65) Prior Publication Data

US 2024/0191553 A1 Jun. 13, 2024

(30) Foreign Application Priority Data

Mar. 31, 2021 (DE) ..................... 10 2021 108 161.0

(51) Int. Cl.
*E05F 15/44* (2015.01)
*B61D 19/00* (2006.01)
(Continued)

(52) U.S. Cl.
CPC ............ *E05F 15/44* (2015.01); *B61D 19/005* (2013.01); *B61D 19/026* (2013.01); *B66B 13/26* (2013.01);
(Continued)

(58) Field of Classification Search
CPC ..... E05F 15/44; B61D 19/005; B61D 19/026; B66B 13/26; E05Y 2400/44; E05Y 2900/132; E05Y 2900/51; E05Y 2900/531
See application file for complete search history.

(56) References Cited

U.S. PATENT DOCUMENTS 6,951,140 B2 10/2005 Ogino et al.
9,059,712 B2 6/2015 Ishihara
(Continued)

FOREIGN PATENT DOCUMENTS

CN 110618468 A 12/2019
DE 102007002745 A1 7/2007
(Continued)

OTHER PUBLICATIONS

EP-3581748-A1, English Translation (Year: 2019).*
(Continued)

*Primary Examiner* — Ryan D Walsh
(74) *Attorney, Agent, or Firm* — Barnes & Thornburg LLP

(57) ABSTRACT

A device for recognizing a movement of an object caught in a door of a vehicle includes a carrier element, to which a first electrical conductor is fastened. Furthermore, the device includes an elastic object-contact element, to which a second electrical conductor is fastened. The elastic object-contact element is connected to the carrier element such that, when the caught object is pulled in a selected sensing direction, the first electrical conductor and the second electrical conductor are brought into contact with each other.

20 Claims, 11 Drawing Sheets

(51) Int. Cl.
*B61D 19/02* (2006.01)
*B66B 13/26* (2006.01)

(52) U.S. Cl.
CPC ..... *E05Y 2400/44* (2013.01); *E05Y 2900/132* (2013.01); *E05Y 2900/51* (2013.01); *E05Y 2900/531* (2013.01)

(56) References Cited

U.S. PATENT DOCUMENTS

| | | | | |
|---|---|---|---|---|
| 11,261,643 | B2 * | 3/2022 | Kawase | E05F 15/42 |
| 2013/0307567 | A1 * | 11/2013 | Bolbocianu | G01V 3/02 324/661 |
| 2016/0144699 | A1 | 5/2016 | Salles et al. | |
| 2019/0390501 | A1 | 12/2019 | Kawase et al. | |
| 2020/0291709 | A1 | 9/2020 | Hirtenlehner et al. | |
| 2021/0148152 | A1 * | 5/2021 | Murree | E05F 15/46 |

FOREIGN PATENT DOCUMENTS

| | | | | | |
|---|---|---|---|---|---|
| DE | 102009035611 | A1 | | 3/2010 | |
| DE | 102011077014 | A1 | | 12/2012 | |
| DE | 102018121924 | B3 | | 2/2020 | |
| EP | 2532820 | B1 | | 11/2017 | |
| EP | 2159361 | B1 | | 1/2019 | |
| EP | 3581748 | A1 | * | 12/2019 | G01V 9/00 |
| EP | 3584139 | A1 | | 12/2019 | |
| JP | 4728888 | B2 | * | 7/2011 | |
| JP | 5695871 | B2 | * | 4/2015 | |
| JP | 6516052 | B1 | * | 5/2019 | B61D 19/026 |
| JP | 2020002763 | A | | 1/2020 | |
| KR | 20190011850 | A | * | 2/2019 | E05F 15/44 |
| WO | 2019057695 | A1 | | 3/2019 | |
| WO | WO-2022055157 | A1 | * | 3/2022 | H03K 17/975 |

OTHER PUBLICATIONS

JP-4728888-B2, English Translation (Year: 2011).*
JP-5695871-B2, English Translation (Year: 2015).*
JP-6516052-B1, English Translation (Year: 2019).*
KR-20190011850-A, English Translation (Year: 2019).*
WO-2022055157-A1, English Translation (Year: 2022).*
International Search Report corresponding to PCT/EP2022/058446 dated Jul. 25, 2022.

* cited by examiner

DEVICE AND METHOD FOR RECOGNIZING A MOVEMENT OF AN OBJECT CAUGHT IN A DOOR OF A VEHICLE, AND DETECTION SYSTEM

CROSS REFERENCE AND PRIORITY CLAIM

This patent application is a U.S. National Phase of International Patent Application No. PCT/EP2022/058446 filed Mar. 30, 2022, which claims priority to German Patent Application No. 10 2021 108 161.0, the disclosure of which being incorporated herein by reference in their entireties.

FIELD

Disclosed embodiments relate to a device for recognizing a movement of an object caught in a door of a vehicle, to a method for recognizing a movement of an object caught in a door of a vehicle, and to a detection system.

BACKGROUND

Previous detection systems mostly fail to distinguish between detection from the inside or from the outside or are unable to distinguish between them reliably.

SUMMARY

Disclosed embodiments provide an improved device for recognizing a movement of an object caught in a door of a vehicle, an improved method for recognizing a movement of an object caught in a door of a vehicle, and an improved detection system.

BRIEF DESCRIPTION OF THE FIGURES

Exemplary embodiments of the approach presented here are explained in greater detail in the following description with reference to the Figures, in which.

DETAILED DESCRIPTION

Figure 1:
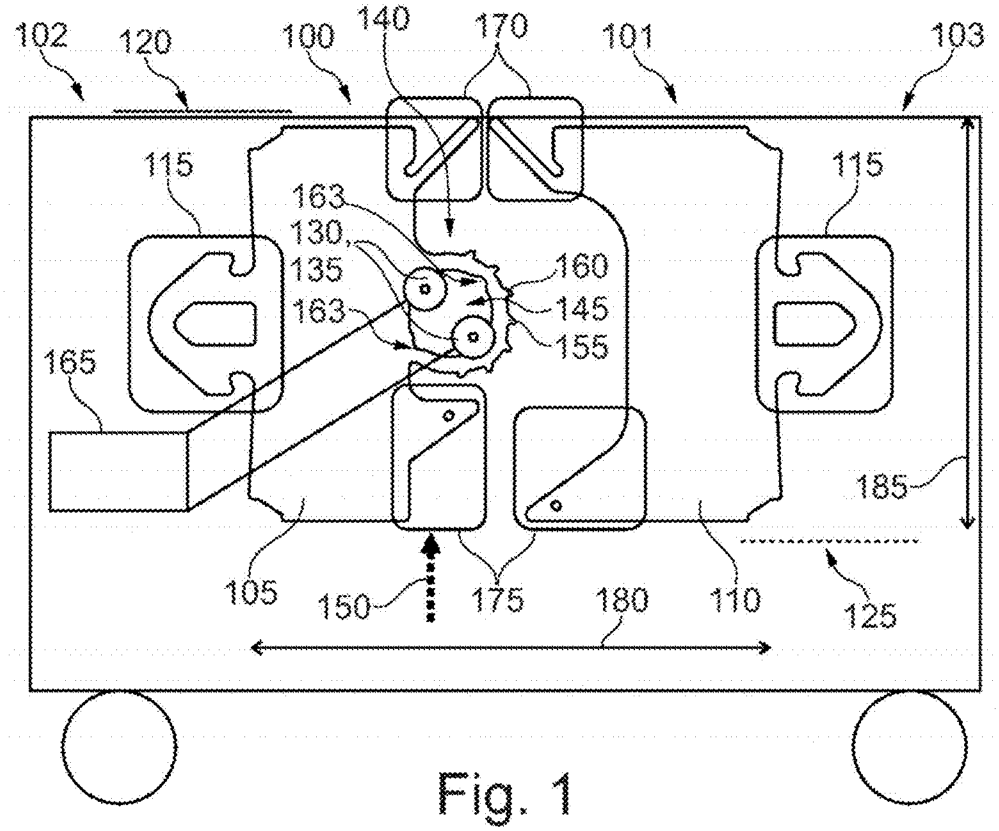
FIG. 1 shows a cross-section of a device according to an exemplary embodiment.

Disclosed embodiments provide a device for recognizing a movement of an object caught in a door of a vehicle, by a method for recognizing a movement of an object caught in a door of a vehicle, and by a detection system.

The advantages achievable with the disclosed embodiments are that a movement of an object caught in a door of a vehicle can be recognized by a device. In doing so, the device distinguishes, for example, whether the movement originates from outside or inside the vehicle. In the case of a movement from outside the vehicle, for example, a warning is triggered, but not in the case of a movement from inside. This results from the fact that, for example, in the event of a pull or a movement from outside the vehicle, it can be assumed that possibly an object is caught in a door of a rail vehicle, which would cause a person holding the caught object with their hands to be dragged along when the rail vehicle departs. The approach presented here is intended to warn of such a situation as early as possible and thus avoid it as far as possible.

The approach presented herein creates a device for recognizing a movement of an object caught in a door of a vehicle, having the following features: a carrier element, to which a first electrical conductor is fastened; an elastic object-contact element, to which a second electrical conductor is fastened, wherein the elastic object-contact element is connected to the carrier element such that, when the caught object is pulled in a selected sensing direction, the first and second electrical conductors are contacted with each other.

The vehicle may be a passenger transport vehicle. In particular, the vehicle may be a rail vehicle. The device may also be referred to as an integrated anti-catch or catch recognition device. A carrier element may be an element that is installed on the door of the vehicle and, together with another carrier element, forms a seal for the door leaves in the closed state. An elastic object-contact element is located on the carrier element. A first electrical conductor, for example a contact wire, is arranged or fastened in some form to the carrier element and, together with a second conductor arranged or fastened in some form to the elastic object-contact element, forms a contact device in which the first conductor is brought into contact with the second conductor when the object-contact element is squeezed or otherwise deformed when a pull is applied to the object in a predetermined pulling direction. To this end, for example, the object-contact element may be formed as a type of balloon envelope over the carrier element. The balloon envelope contains the two electrical conductors. When a caught object is moved in the sensing direction, the two electrical conductors contact each other and a corresponding warning is triggered, for example.

According to one embodiment, the carrier element and the elastic object-contact element can be formed in one piece. This offers the advantage that the elements can be produced cost-effectively and in a time-saving manner.

The first and second conductors can be formed in a cavity, wherein the cavity is formed by the carrier element and the elastic object-contact element. This offers the advantage that the cavity is already created during production and does not need to be subsequently milled. In addition, this provides good protection of the two conductors, for example against contamination or rapid corrosion.

Alternatively, the first and/or the second conductor may be arranged in a cavity of the carrier element and/or wherein the elastic object-contact element forms a balloon envelope on the carrier element. In this case, the balloon envelope is formed elastically. This offers the advantage that it is depressed when a caught object is pulled out of the closed door in the sensing direction. The depressed balloon envelope ensures that the first and second conductors are contacted and trigger a detection. A conductor located in the cavity is also very well protected.

The elastic object-contact element may include a switch tappet and/or protrusion, in particular wherein the protrusion protrudes from the elastic object-contact element on a side thereof remote from the carrier element. This provides the advantage that a movement of an object caught in the door of the vehicle is sensed by the protrusion when the object is pulled out of the door in the sensing direction. The object contacts the switch tappet or protrusion, causing the protrusion to elastically bend and initiate contacting between the first conductor and the second conductor. The contacting subsequently triggers an output of a warning. In addition, the use of the protrusion also allows very accurate and precise recognition of even small movements or tensile forces.

The first conductor can be upstream of the second conductor in the sensing direction, or wherein the second conductor is downstream of the first conductor in the sensing direction. This offers the advantage that the conductors are only contacted when a movement of an object caught in the door of the vehicle occurs, for example from the outside. For example, if a jacket gets caught in the door on the platform and a passenger pulls on their jacket to release it from the door.

The device can have an anti-vandalism element which is located upstream of the elastic object-contact element in the sensing direction. The anti-vandalism element is thus also located upstream of the first and second conductors. This offers the advantage that contacting of the two conductors caused by vandalism is prevented and, if necessary, the object-contact element is also protected to the greatest possible extent against damage or destruction.

The device can have a sealing element downstream of the elastic object-contact element in the sensing direction. This offers the advantage that, for example, a door or a door gap of the vehicle to which the device is fastened is reliably sealed in the closed state. This can also provide the best possible protection of the device against contamination or damage.

The device may include a further electrical conductor fastened to the carrier element, in particular wherein the first conductor is arranged in a region of a first end of the elastic object-contact element on the carrier element and the third conductor is arranged in a region of the elastic object-contact element on the carrier element opposite the first end. This offers the advantage that a movement of a caught object in the door can be detected more accurately.

The device can have a further carrier element that has a recess so as to receive the elastic object-contact element in the recess. Advantageously, this ensures that the object-contact element is optimally supported.

The device may have a catch recognition element designed as a pressure sensor to recognize an object caught in the door of the vehicle, in particular wherein the catch recognition element is embedded in the carrier element or in the further carrier element. This offers the advantage that the catch recognition element ensures additional catch protection if, for example, recognition elsewhere is too insensitive or ambiguous.

According to a further embodiment, a detection system is provided which can include a device according to a variant presented here and an evaluation device, wherein the evaluation device is designed to recognize a movement of the object caught in the door of the vehicle in the event of a recognized electrical contact between the first conductor and second conductor.

Additionally, a method for recognizing a movement of an object caught in a door of a vehicle is presented, includes detecting an electrical contact between the first conductor and the second conductor, and outputting a recognition signal for signaling the movement of the object caught in the door of the vehicle, in response to the detection of the electrical contact.

Advantageously, there is also a computer program product or computer program including program code that may be stored on a machine-readable carrier or storage medium such as a semi-conductor memory, a hard disk memory, or an optical memory. When the program product or program is run on a computer or device, the program product or program may be used to perform, implement, and/or control the method according to any one of the embodiments described above.

FIG. 1 shows a cross-section of a device 100 according to an exemplary embodiment for recognizing a movement of an object caught in a door 101 of a vehicle 103. The device in this case may be part of a detection system 102. The device 100 includes a carrier element 105 and here another carrier element 110. The carrier elements 105, 110 for example comprise elastomer, an elastically deformable plastic material. After extrusion of such an element 105, 110, with, for example, simultaneous embedding of the conductors described in greater detail below, the resultant continuous material can be cut to the desired length as required and the connectors can be attached. For use in a rail vehicle as the vehicle 103, the elastomer should meet railroad-specific fire protection requirements.

The carrier elements 105, 110 each comprise an attachment element 115. The attachment element 115 is configured to attach the carrier elements 105, 110 to a door 101 each of the vehicle 103.

In the assembled state, the device 100 is arranged between an outer side 120 and an inner side 125 of one wing of the door 101 of the vehicle 103. The device 100 is shown in FIG. 1 in a non-closed state.

A first electrical conductor 130 is fastened to or embedded in the carrier element 105. A second electrical conductor 135 is fastened to or embedded in an elastic object-contact element 140. The elastic object-contact element 140 is connected to the carrier element 105 such that when a caught object is pulled in a selected sensing direction 150, which here is, for example, in a direction out of the vehicle, the first and second electrical conductors contact each other. For example, the second conductor 135 is pressed onto the first conductor by the pull of the object-contact element 140, causing electrical contact between the first electrical conductor 130 and second electrical conductor 135 that can be sensed and processed by an evaluation device described in greater detail below. The carrier element 105 and the elastic object-contact element 140 are, for example, formed in one piece.

In the exemplary embodiment shown in FIG. 1, the elastic object-contact element 140 and the carrier element 105 form a cavity 145 in which the first and second conductors 130, 135 are disposed. In this example, the elastic object-contact element 140 forms a balloon envelope 155 on the carrier element 105. By way of example, the balloon envelope 155 includes nubs 160 on the outer sides to effect good mechanical contact between the object and the object-contact element 140. The nubs 160 are configured to provide the best possible bearing or contact between the object and the. At the same time, these nubs can cause the elastic object-contact element 140 to collapse when the clamped object is pulled, or these nubs 160 define buckling points 163 on the rear side of the object-contact element 140, where the deformation can take place in a defined manner when the object is caught. Also, among other things, a notching may also be provided, for example, at a contact point between the object-contact element 140 and the carrier element 105, which also provides a defined buckling point 163 in the event of a buckling of the object-contact element 140. As a result of these notchings, a defined and directed buckling of the object-contact element 140 can thus be achieved, so that contacting of the conductors can also reliably take place in such a case.

The first conductor 130 is upstream of the second conductor 135 in the sensing direction 150, whereby the second conductor 135 is downstream of the first conductor 130 in the sensing direction 150. The sensing direction 150 is formed such that only a movement of the object caught in the door of the vehicle is recognized when the movement or a pull on an object occurs from outside the vehicle, i.e., in the sensing direction 150, for example, when a jacket is caught between the carrier elements 105, 110 and a traveler on the platform attempts to pull the jacket out of the door. This results in a squeezing of the object-contact element 140 and consequently an electrical contact between the first conductor 130 and the second conductor 135. The electrical contact is sensed by an evaluation device 165 of the detection system 102. In addition to the evaluation device 165, the detection system 102 includes the device 100 and recognizes the movement of the object caught in the door of the vehicle, for example, based on an electric current flow between the first conductor 130 and the second conductor 135 in the event that the first conductor 130 contacts the second conductor 135. The evaluation device 165 is connected to the first and second conductors 130, 135 for this purpose.

Furthermore, the device 100 includes a sealing element 170 and an anti-vandalism element 175. The sealing element 170 is positioned downstream of the carrier elements 105, 110, for example in the sensing direction 150, and ensures, among other things, that the door leaves are sealed against environmental influences such as rain or snow. The sealing element 170 can also implement a type of finger or pinch protection. The sealing element 170 is arranged on the carrier elements 105, 110 and is aligned with the outer side 120 of the door leaves. The sealing element 170 includes, for example, two elastic, elongate elements, wherein one element is arranged on each of the carrier element 105 and the further carrier element 110. The elements have a 45° degree angle to each other, for example.

According to the exemplary embodiment shown in FIG. 1, the anti-vandalism element 175 is positioned in front of the first and second conductors 130, 135 in the sensing direction 150. The anti-vandalism element 175 thus protects the first and second conductors 130, 135 from vandalism, such as the introduction of a foreign object into a gap between the door leaves, since the anti-vandalism element 175 must first be overcome before intentional detection can be triggered. Additionally, for example, damage to or destruction of the object-contact element 160 by the anti-vandalism element 175 can also be counteracted. In the exemplary embodiment shown in FIG. 1, the anti-vandalism element 175 consists of two anti-vandalism bodies, wherein one anti-vandalism body is arranged on each of the carrier element 105 and the further carrier element 110. The triangular geometry of the anti-vandalism bodies 175 prevents, for example, intentional detection from being triggered from the inner side 125 of the door leaf or the object-contact element from being damaged or destroyed when the doors of the vehicle are closed.

In a double-leaf door system, according to an exemplary embodiment of the approach presented here, for example, the front edge of each of the two door leaves is equipped with a sealing element 170, which can also act as a finger protection rubber. For the requirement of a drag-along recognition, at least one of the two door leaves according to the exemplary embodiment shown in FIG. 1 should be equipped with a detection system 102, for example also in the form of an "active finger protection rubber", which is interrogated when the rail vehicle 103 starts and would thus detect a person or a heavy object (e.g., stroller) being dragged along. The second door leaf may either also have another carrier element 110, or may not include a detection system (passive finger protection rubber).

In a single-leaf door system, for example, one of the two sealing elements 170 is fastened to the vehicle portal.

The object-contact element 140 also includes, for example, the balloon envelope 155, which can also be referred to as a switch element, which recognizes caught foreign objects only under tensile stress in the sensing direction 150, in this case, for example, to the outside. By pulling under a defined force outwards, a contact is closed in the balloon envelope 155 between the two conductors 130, 135 shown in FIG. 1, and thus this contact closure can be sensed by an evaluation device 165, which can also be referred to as an evaluation unit.

During a normal door closing process, the sealing elements 170 of the carrier element 105 are pressed against the respective sealing surfaces or against the sealing element 170 of the further carrier element 110. This ensures the tightness of a closed door 101. The balloon envelope 155 need not be in contact with the opposite carrier element 105, 110. No catching forces result, and therefore no detection.

For example, the dimensions and tolerances for the position of the carrier elements 105, 100 in the closed locked state of a 2-leaf entry door may be as follows:

- nominal rubber width A 180 for a 2-leaf version=30 to 100 mm
- carrier element width 185 (door leaf width) B=20 to 50 mm
- functional safeguarding (catch protection and recognition): pressing tolerance in x-direction (allowed position of the two carrier elements 105, 100 to each other)

Δx>=+/−1 mm (wherein the variable x represents a position in the displacement or closing direction of the door)

functional safeguarding (catch protection and recognition): lateral offset in y-direction Δy>=+/−2 mm (as is described in greater detail below in FIGS. 14 and 15 and y represents a variable that in essence maps a position in the sensing direction with respect to the device).

The background of the approach presented here is a solution for recognizing if a person will be dragged along when a train starts with the lowest possible number of false detections (i.e. an oversensitive system reduces the availability of the overall system). Previous systems mostly do not distinguish between a detection from the inside or from the outside or they are not able to distinguish these reliably. For example, it should be reliably recognized if someone is unable to pull out a fabric to the outside (e.g., coat or backpack is caught, the person is on the outside and cannot pull the coat or backpack out of the closed door (e.g., due to an inserted object or a buckle). In this case, the person may be dragged along if the person cannot separate from the garment. Therefore, a signal is generated by the boarding system (in this case the "improved finger protection rubber") to prevent or stop the vehicle from starting. By contrast, however, no signal is generated, for example, if the person is inside and the object is pulled out to the inside.

Figure 2:
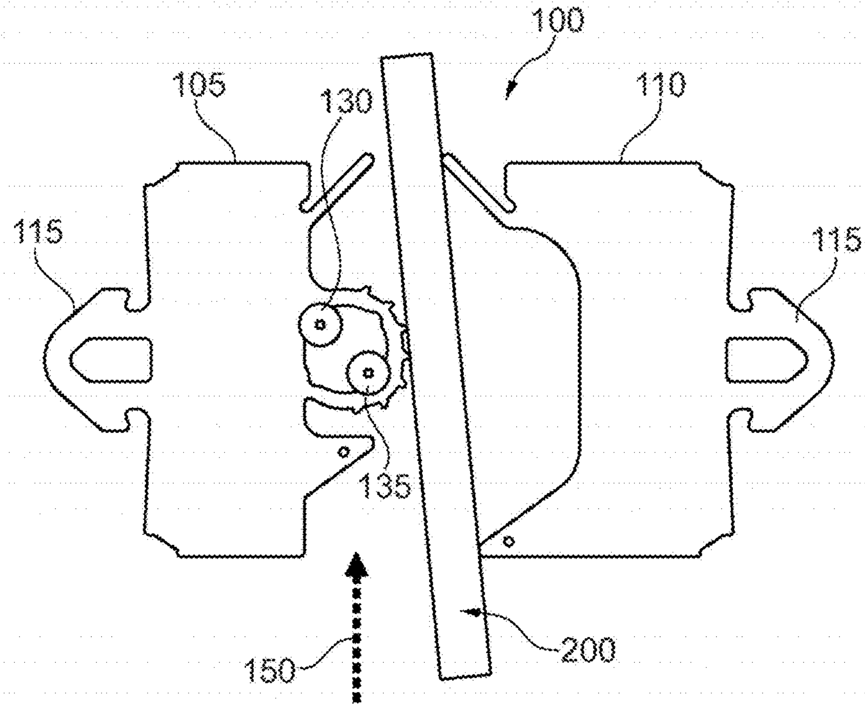
FIG. 2 shows a cross-section of a device according to an exemplary embodiment.

FIG. 2 shows a cross-section of a device 100 according to an exemplary embodiment for recognizing a movement of an object 200 caught in a door of a vehicle. The device 100 may be the device 100 described in FIG. 1. Referring now to FIG. 2, an object 200 is shown to be located between the carrier element 105 and the further carrier element 110. The object 200 may be, for example, a rigid foreign object such as a book. The device 100 is in a closing operation or closed state. No detection of a caught object or warning is triggered because the second conductor 135 is not in contact with the first conductor 130.

Figure 3:
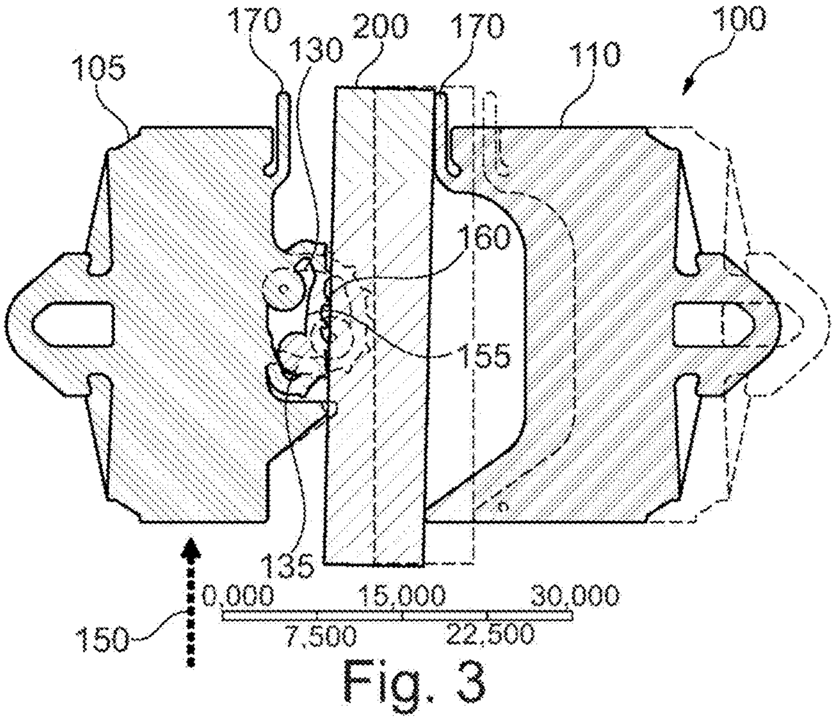
FIG. 3 shows a cross-section of a device according to an exemplary embodiment.

FIG. 3 shows a cross-section of a device 100 according to an exemplary embodiment for recognizing a movement of an object 200 caught in a door of a vehicle. This is a development of the closing process shown in FIG. 2. In FIG. 3, the device 100 is in a state with the door leaves closed. The object 200 is located between the carrier element 105 and the further carrier element 110. The caught object 200 prevents the sealing member 170 from sealing.

Further, the caught object 200 causes the balloon envelope 155 to be depressed. In the process, the second conductor 135 is pressed below the first conductor 130 or against the carrier element 105. However, no detection of a pull of the object 200 in the sensing direction 150 occurs, so the first and second conductors 130, 135 do not come into contact. Contact would not be made until a pulling force were applied to the object 200 in the sensing direction 150. If a pulling force were applied to the object 200 in a direction opposite the sensing direction 150, detection of a pull on the object in the sensing direction 150 likewise would not be triggered.

Figure 4:
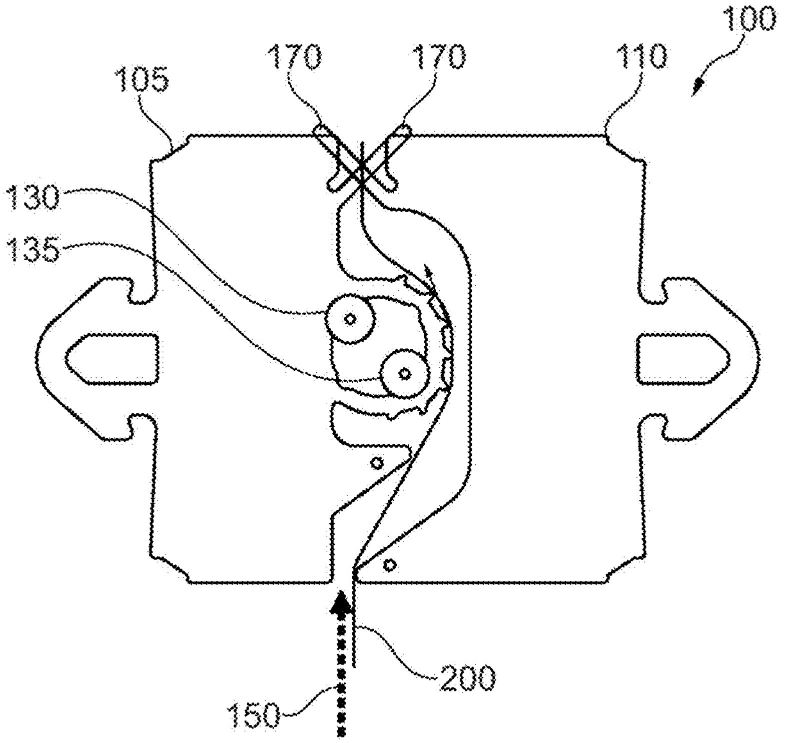
FIG. 4 shows a cross-section of a device according to an exemplary embodiment.

FIG. 4 shows a cross-section of a device 100 according to an exemplary embodiment for recognizing a movement of an object 200 caught in a door of a vehicle. The device 100 is in a state with the door leaves closed. In such a closed state, the elements of the sealing element 170 overlap so that the device 100 is sealed.

In FIG. 4, the object 200 is formed by way of example as a fabric, for example as part of a jacket or a coat. In FIG. 4, the object 200 is sandwiched between the carrier element 105 and the further carrier element 110. By way of example, FIG. 4 shows the beginning of the extraction process of the object 200 in the sensing direction 150. The clamped object 200 does not yet trigger detection of a pull on the object in the sensing direction 150. Detection of a pull on the object in the sensing direction 150 is not triggered until the object 200 is pulled out of the closed door in sensing direction 150. This process is illustrated in FIG. 5.

If, during the closing process of the door leaf or door leaves, a sufficiently large foreign body is located between the two carrier elements 105, 110, contact between the balloon envelope 155 and the foreign body occurs before the closed end position of the door leaf or leaves is reached. Part of the closing force is directed into the balloon envelope 155, which, due to the geometry of the balloon envelope 155, causes the electrically conductive contacts/material 130, 135 to be removed. Thus, for the time being, there is reliably no detection by the balloon envelope 155 for the required drag-along recognition.

For the catch recognition of a foreign body without tensile stress, the recognition is carried out with the help of the drive train of the door system (e.g. the motor current recognition), or by an alternative additional catch recognition element, which is actively interrogated exclusively during the entire or a desired part of the closing process and can be switched inactive at the latest as soon as the door is closed and locked (see the following FIGS. 10 to 13).

Figure 5:
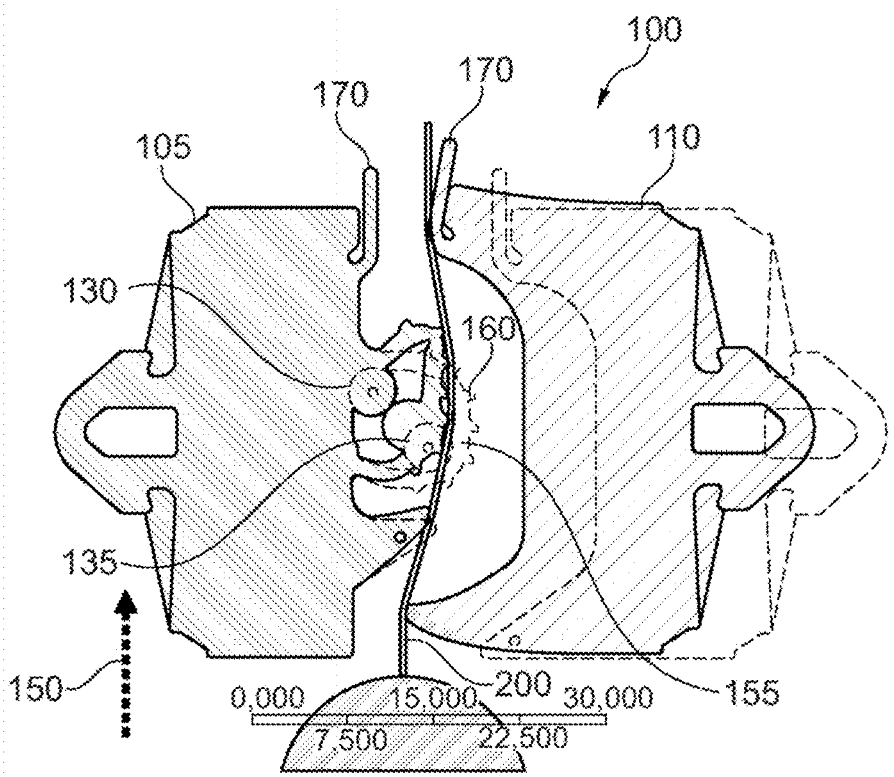
FIG. 5 shows a cross-section of a device according to an exemplary embodiment.

FIG. 5 shows a cross-section of a device 100 according to an exemplary embodiment for recognizing a movement of an object 200 caught in a door of a vehicle. This is a development of the process of pulling out the object 200 from FIG. 4.

In FIG. 5, the object 200 is in the closed door. The object 200 is pulled out of the door in the sensing direction 150, wherein this results in a detection of a pull on the object in the sensing direction 150 as electrical contact is made between the first conductor 130 and the second conductor 135. The electrical contact occurs as the balloon envelope 155 is folded in or over in the sensing direction 150 due to the pulling force applied to the nubs 160, causing the second conductor 135 to contact the first conductor 130. This is the case, for example, when a passenger gets caught in the door by a fabric while exiting the train and pulls the fabric outwardly from the door. Detection is generally required for this process, as there is a risk of the traveler being dragged along.

If narrow objects 200 (e.g., items of clothing or narrow dog leashes) that are too small for direct detection of a pull on the object in the sensing direction 150 during the door closing operation are caught, detection of a pull on the object in the sensing direction 150 occurs when an attempt is made to pull these objects 200 out while the door is closed. As a result of the pull-out, a lateral force is introduced into the balloon envelope 155. This causes the balloon envelope 155 to collapse, which in turn results in an electrical contact, which may also be referred to as a switching contact, thus triggering the detection. However, if an object is pulled inwards, this is not detected (see FIG. 6 below).

Figure 6:
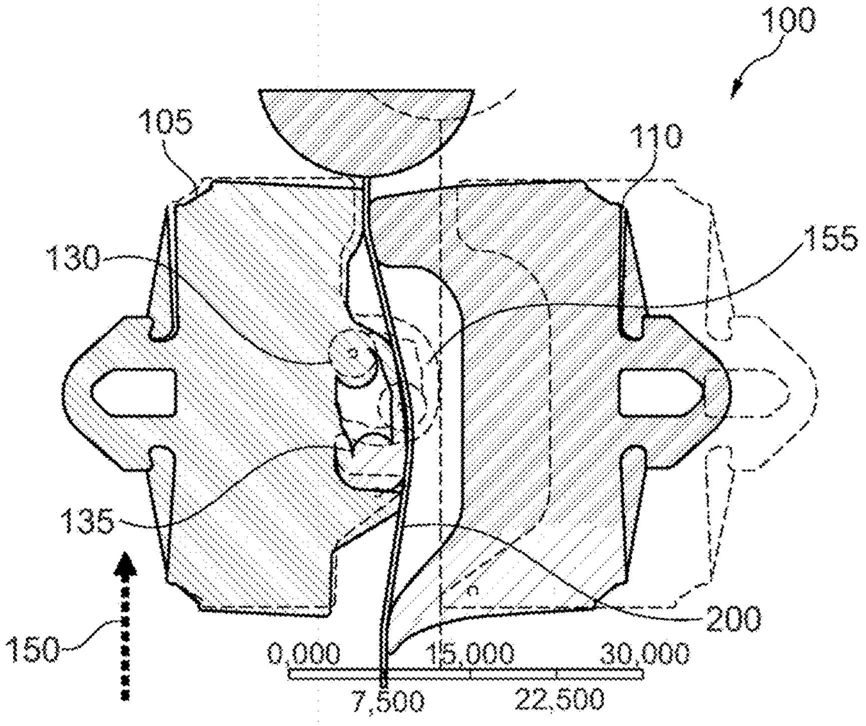
FIG. 6 shows a cross-section of a device according to an exemplary embodiment.

FIG. 6 shows a cross-section of a device 100 according to an exemplary embodiment for recognizing a movement of an object 200 caught in a door of a vehicle. This is an embodiment from FIG. 5. In FIG. 6, the object 200 is pulled out of the closed door against the sensing direction 150. As a result, no detection occurs because the second conductor 135 does not contact the first conductor 130. The balloon envelope 155 does collapse due to the applied pulling force, but, in doing so, the first conductor 130 and the second conductor 135 do not make contact. The second conductor 135 is then merely downstream of the first conductor 130 in the sensing direction 150, but without contacting the first conductor 130. This is the case, for example, when a passenger gets caught in the door by a fabric while boarding the train and pulls the cloth inward out of the door. This operation generally does not require detection of a pull on the object in the sensing direction 150, since the cloth can be pulled out of the closed door without difficulty, since there is no risk of the traveler being dragged along.

Figure 7:
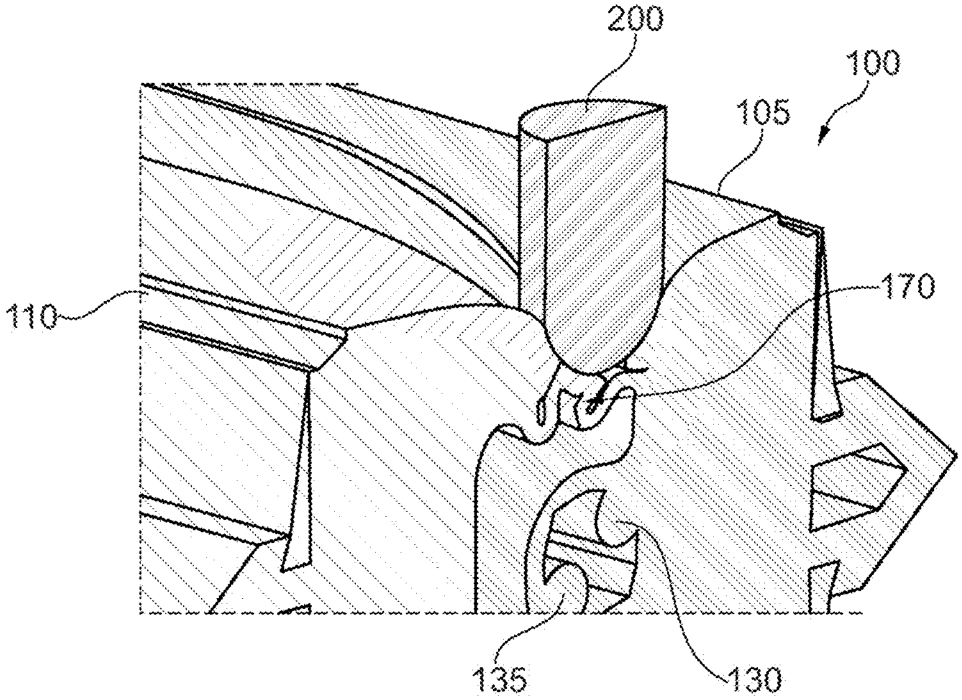
FIG. 7 shows a three-dimensional view of a device according to an exemplary embodiment.

FIG. 7 shows a three-dimensional view of a device 100 according to an exemplary embodiment for recognizing a movement of an object 200 caught in a door of a vehicle. FIG. 7 shows a penetration of an object 200 from the outside. This operation does not trigger detection of a pull on the object in the sensing direction 150, since the first and second conductors 130, 135 are not contacted by the application of force from the outside. Moreover, the sealing element 170 should be passed beforehand.

In the door closed position, unintentional detection of a pull on the object in the sensing direction 150 may also occur, for example if a foreign object from inside or outside the vehicle is pressed against the sealing element 170. Unintentional detection is problematic because damage to the door system may occur, reducing the availability of the rail vehicle. Such detection should be avoided if possible, as this would disrupt driving operations. The sealing element 170 is therefore designed to prevent unwanted detection, in the event of "foreign body penetration from inside or outside the vehicle", of the finger protection rubber, or to prevent it only after a force, e.g., of >150 N in the case of a foreign body with a diameter of 20 mm may lead to an undesirable detection of a pull on the object in the sensing direction 150 (with the exception here of the area of the sealing elements 170, since in this case, depending on the tolerance (pressure tolerance), a pull on the object in the sensing direction 150 may also be detected at lower forces or if a smaller object is pushed in between).

In the event of penetration from the inside, the balloon envelope 155 is additionally protected by the anti-vandalism element, which can also be referred to as vandalism geometry. Only when these have been overcome does an unintentional detection of a pull on the object in the sensing direction 150 occur. This process is illustrated in FIG. 8.

The anti-vandalism element was designed so that a vandalism force of at least 150 N (20 mm diameter) should act in order for the test object to have an impact on the balloon envelope 155. In the case of penetration from the outside, the force would cause a distancing of the two electrical conductors 130, 135 (electrically conductive material) and thus would also not trigger detection of a pull on the object in the sensing direction 150.

Figure 8:
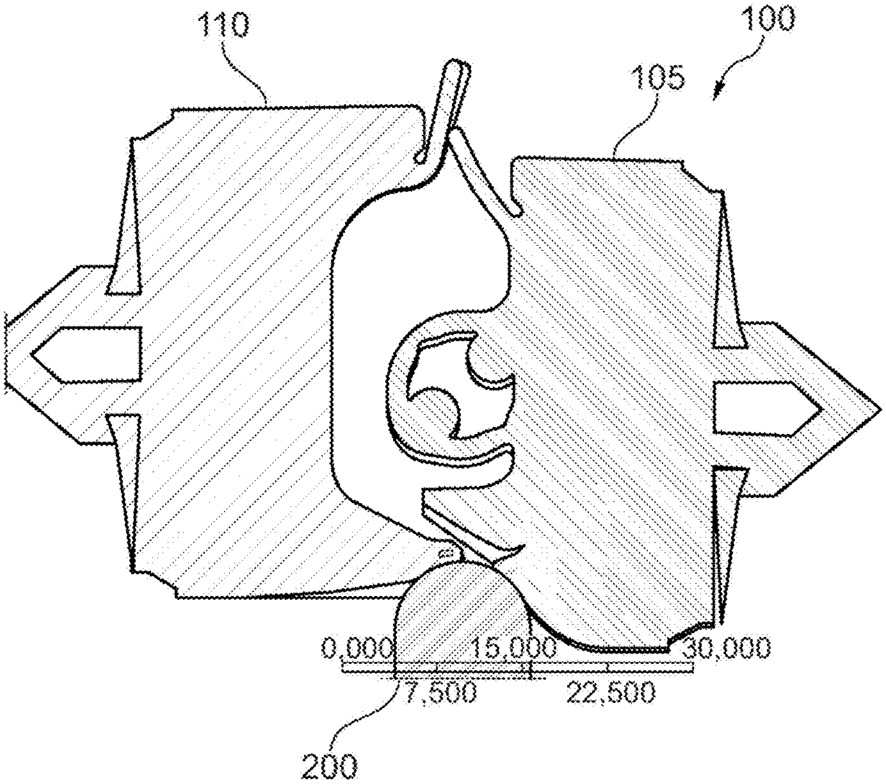
FIG. 8 shows a three-dimensional view of a device according to an exemplary embodiment.

FIG. 8 shows a three-dimensional view of a device 100 according to an exemplary embodiment for recognizing a movement of an object 200 caught in a door of a vehicle. In FIG. 8, a penetration of an object 200 from the inside is shown. During this process, the first and second conductors 130, 135 are protected by the anti-vandalism element 175, so that initially no detection of a pull on the object in the sensing direction 150 is triggered. Only when the anti-vandalism element 175 is overcome by the penetrating object 200 is a detection is triggered.

Figure 9:
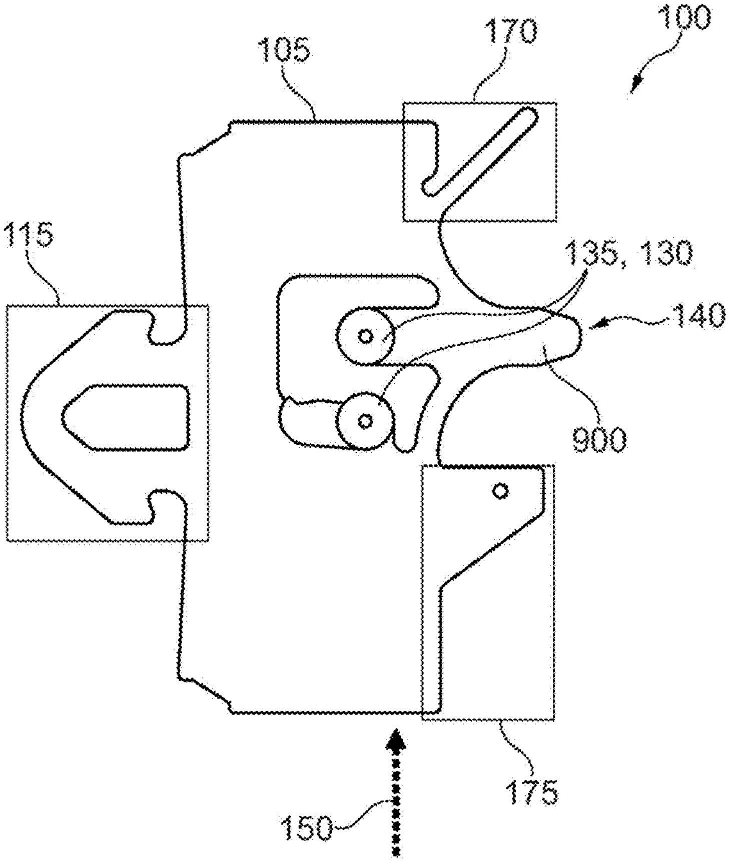
FIG. 9 shows a cross-section of a device according to a further exemplary embodiment.

FIG. 9 shows a cross-sectional view of a device 100 according to another exemplary embodiment for recognizing a movement of an object 200 caught in a door of a vehicle. In this exemplary embodiment, the carrier element 105 includes an elastic object-contact element 140 to which the second electrical conductor 135 is fastened. In an exemplary embodiment, the carrier element 105 and the elastic object-contact element 140 are formed in one piece. The elastic object-contact element 140 is connected to the carrier element 105 in such a way that when the caught object is pulled in the sensing direction 150, the first and second electrical conductors 130, 135 contact each other. As a result, the second conductor 135 is pressed against the first conductor 130, thereby making electrical contact. The elastic object-contact element 140 includes a protrusion 900, wherein the protrusion 900 protrudes from the elastic object-contact element 140 on a side thereof opposite the carrier element 105.

Figure 10:
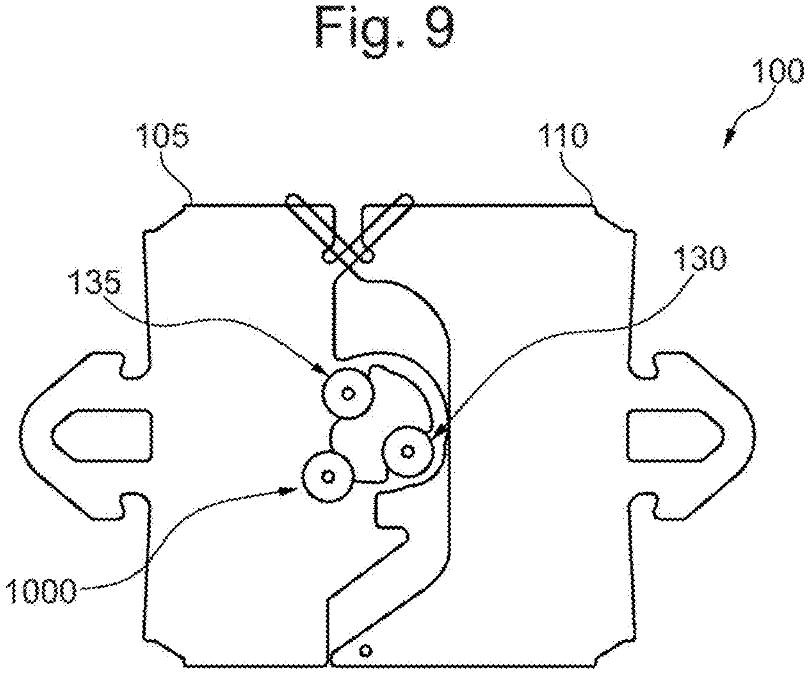
FIG. 10 shows a cross-section of a device according to an additional exemplary embodiment.

FIG. 10 shows a cross-section of a device 100 according to an additional exemplary embodiment for recognizing a movement of an object caught in a door of a vehicle. According to this exemplary embodiment, the device 100 includes an additional electrical conductor 1000. Thus, a total of three electrical conductors 130, 135, 1000 are provided in the device 100. The further electrical conductor 1000 is fastened to the carrier element 105, in particular wherein the first conductor 130 is arranged in a region of a first end of the elastic object-contact element 140 on the carrier element 105 and the third conductor 1000 is arranged in a region of the elastic object-contact element 140 on the carrier element opposite the first end. FIG. 10 thus shows a variant with three electrical conductors 130, 135, 1000, wherein conductors 130 and 135 realize the detection of the drag-along recognition and conductors 130 and 1000 ensure the anti-catch effect if the system-specific recognition (e.g., via motor current) is too insensitive for the standard or project requirements (interrogation of a contact of conductors 130 and 1000 is thus optional). The status interrogation between the electrical conductors 130 and 135 is mainly active in the closed and locked position of the boarding system and during the starting of the rail vehicle for drag-along recognition. The status interrogation between conductors 130 and 1000 is active in the desired parts of the closing process and is mostly not interrogated further at the latest in the closed position of the boarding system to prevent unwanted detections of a pull on the object in sensing direction 150 (for example by manipulations by passengers).

Figure 11:
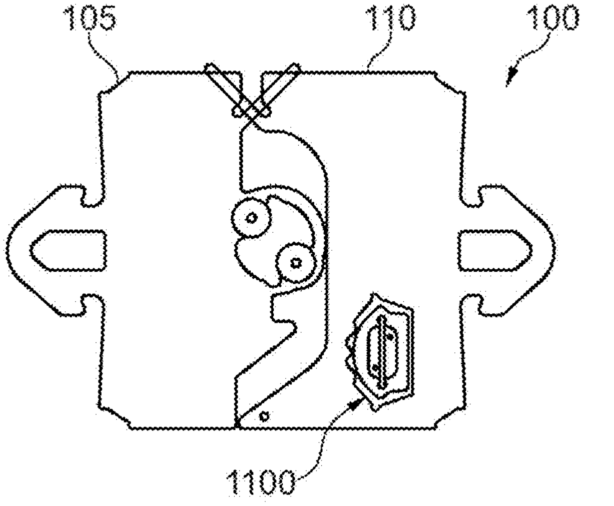
FIG. 11 shows a cross-section of a device according to another exemplary embodiment.

FIG. 11 shows a cross-sectional view of a device 100 according to another exemplary embodiment for recognizing a movement of an object caught in a door of a vehicle. According to this exemplary embodiment, the device 100 includes a catch recognition element 1100 configured as a pressure sensor for recognizing the object caught in the door of the vehicle. By way of example, the catch recognition element 1100 is embedded in the lower region of the further carrier element 110.

Figure 12:
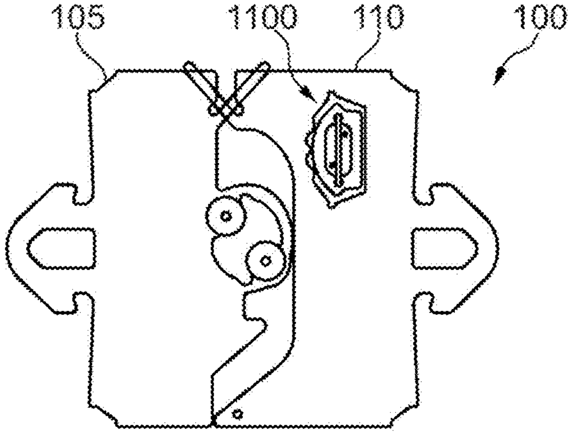
FIG. 12 shows a cross-section of a device according to an exemplary embodiment.
Figure 13:
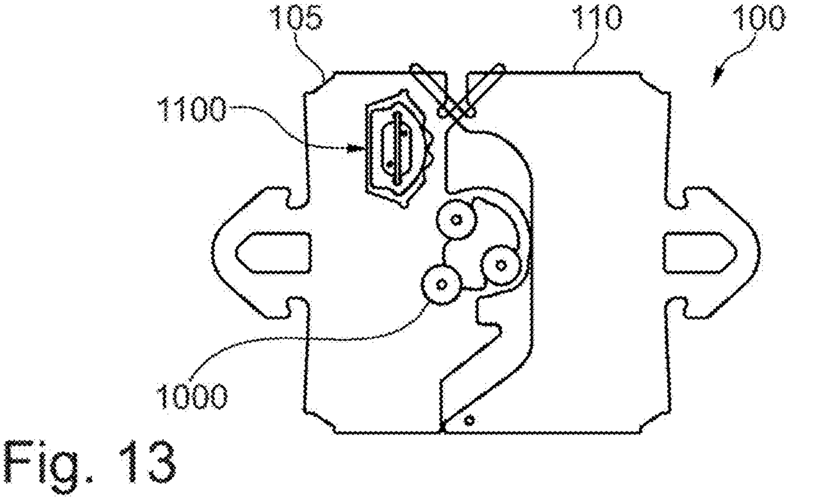
FIG. 13 shows a cross-section of a device according to an exemplary embodiment.

FIG. 11 through FIG. 13 show design variants with two integrated conductors 130, 135 for drag-along recognition and an additional catch recognition element 1100, introduced subsequently, which can also be referred to as a safety edge for an anti-catch device. The catch recognition element 1100 ensures the required anti-catch effect if the system-specific recognition (e.g., via motor current) is too insensitive (this catch recognition element 1100 is optional=>If not required, the cavity for the catch recognition element 1100 can be left free, or filled during or after extrusion). Conveniently, a status interrogation between the conductors 130 and 135 is favorably mainly active in the closed and locked position of the boarding system and during the starting of the rail vehicle for drag-along recognition. The status interrogation of the catch recognition element 1100 is active, for example, in the desired parts of the closing process and is mostly not further interrogated at the latest in the closed position of the boarding system to prevent unwanted detections (for example by passenger tampering).

FIG. 12 shows a cross-section of a device 100 according to an exemplary embodiment for recognizing a movement of an object caught in a door of a vehicle. This may be another embodiment of the catch recognition element 1100 shown in FIG. 11. By way of example, the catch recognition element 1100 is embedded in the upper region of the further carrier element 110.

FIG. 13 shows a cross-section of a device 100 according to an exemplary embodiment for recognizing a movement of an object caught in a door of a vehicle. This may be another embodiment of the catch recognition element 1100 shown in FIG. 12 and in FIG. 13. By way of example, the catch recognition element 1100 is embedded in the upper region of the carrier element 105. Additionally, the device includes a third electrical conductor 1000, as described in greater detail above.

Figure 14:
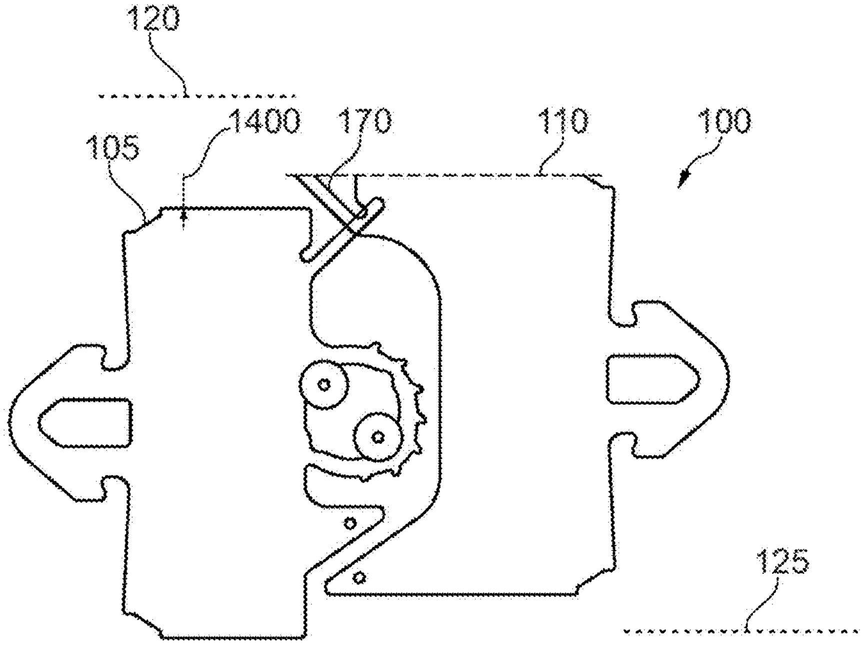
FIG. 14 shows a cross-section of a device according to an exemplary embodiment.

FIG. 14 shows a cross-sectional view of a device 100 according to an exemplary embodiment for recognizing a movement of an object caught in a door of a vehicle. In FIG. 14, the carrier element 105 and the further carrier element 110 have an offset 1400. By way of example, the offset 1400 is four millimeters. The offset 1400 extends in the direction of the outer side 120 of the door leaf. Despite the offset, the sealing element 170 seals the device 100. The width of the sealing surface/length of the sealing element 170 is greater than the permissible lateral offset 1400 Δy, so that there is always sufficient sealing surface.

Figure 15:
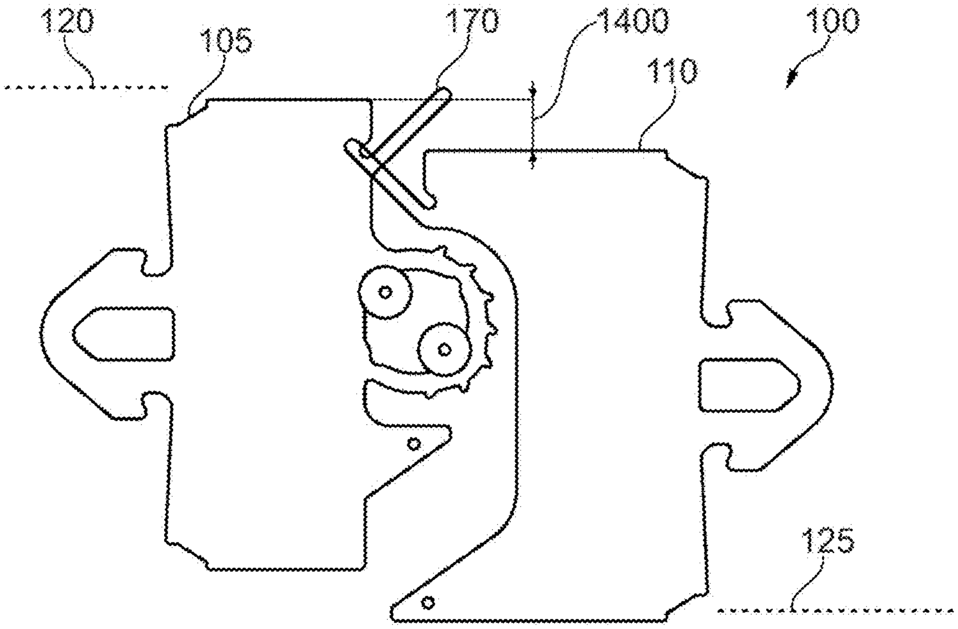
FIG. 15 shows a cross-section of a device according to an exemplary embodiment.

FIG. 15 shows a cross-section of a device 100 according to an exemplary embodiment for recognizing a movement of an object caught in a door of a vehicle. This is another embodiment of the offset shown in FIG. 14. In FIG. 15, the carrier element 105 and the further carrier element 110 have an offset 1400. The offset 1400 is four millimeters, by way of example. The offset 1400 extends in the direction of the inner side 125 of the door leaf. Despite the offset 1400, the sealing element 170 seals the device 100.

Figure 16:
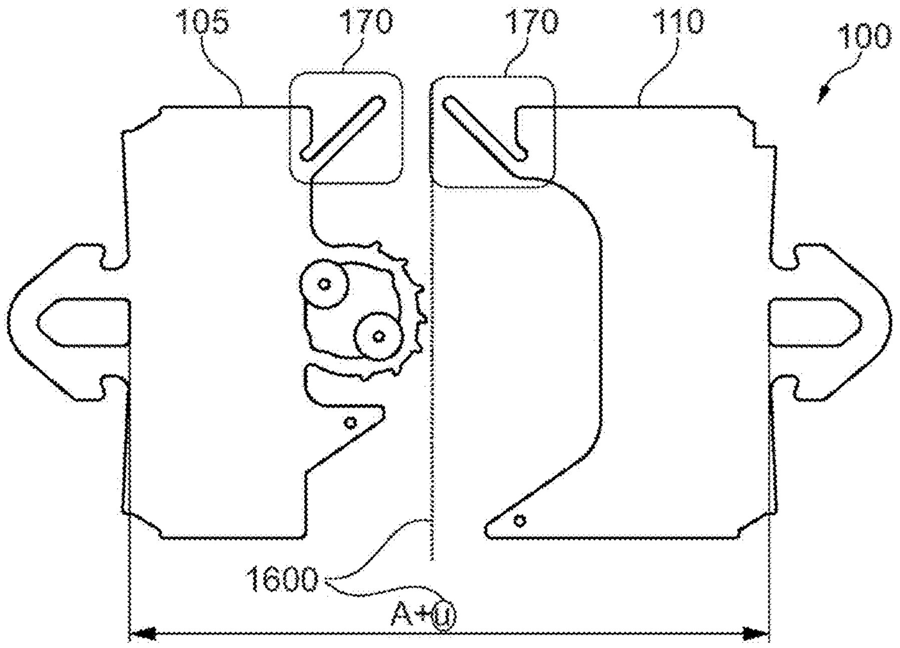
FIG. 16 shows a cross-section of a device according to an exemplary embodiment.

FIG. 16 shows a cross-section of a device 100 according to an exemplary embodiment for recognizing a movement of an object caught in a door of a vehicle. FIG. 16 shows the maximum closing force of 0.15 N/mm and an overlap 1600 of less than 25 millimeters.

Figure 17:
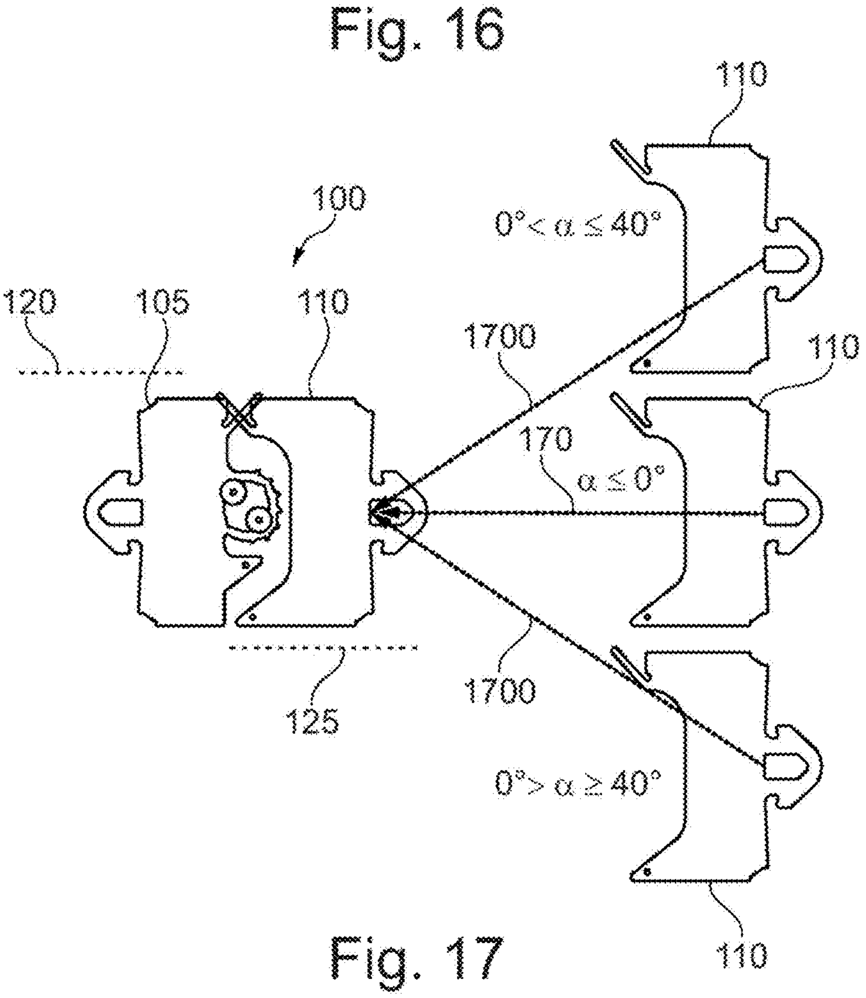
FIG. 17 shows a cross-section of a device according to an exemplary embodiment.

FIG. 17 shows a cross-section of a device 100 according to an exemplary embodiment for recognizing a movement of an object caught in a door of a vehicle. When the door closes, an offset is created by a path of a swing-in motion 1700 according to door closing mechanisms often in common use. The paths of the various swing-in motions 1700 are shown by way of example in FIG. 17 and relate to single-leaf doors and double-leaf asynchronous doors. In the case of double-leaf synchronized doors, the doors meet at an entry angle $\alpha=0°$, as shown in FIG. 1. For single-leaf doors or double-leaf asynchronous doors, the entry angle is between $0°<\alpha\leq 40°$ and $0°>\alpha\geq -40°$, respectively.

FIG. 17 shows three examples of a swing-in motion 1700. The entry angle is 0° degrees when the door closes without a swing-in motion 1700. The entry angle is, by way of example, less than 40° degrees to the outer side 120 of the door leaf if the door is a single-leaf or double-leaf asynchronous door. By way of example, the entry angle is less than 40° degrees to the inner side 125 of the door leaf if it is a single leaf or double leaf asynchronous door.

Figure 18:
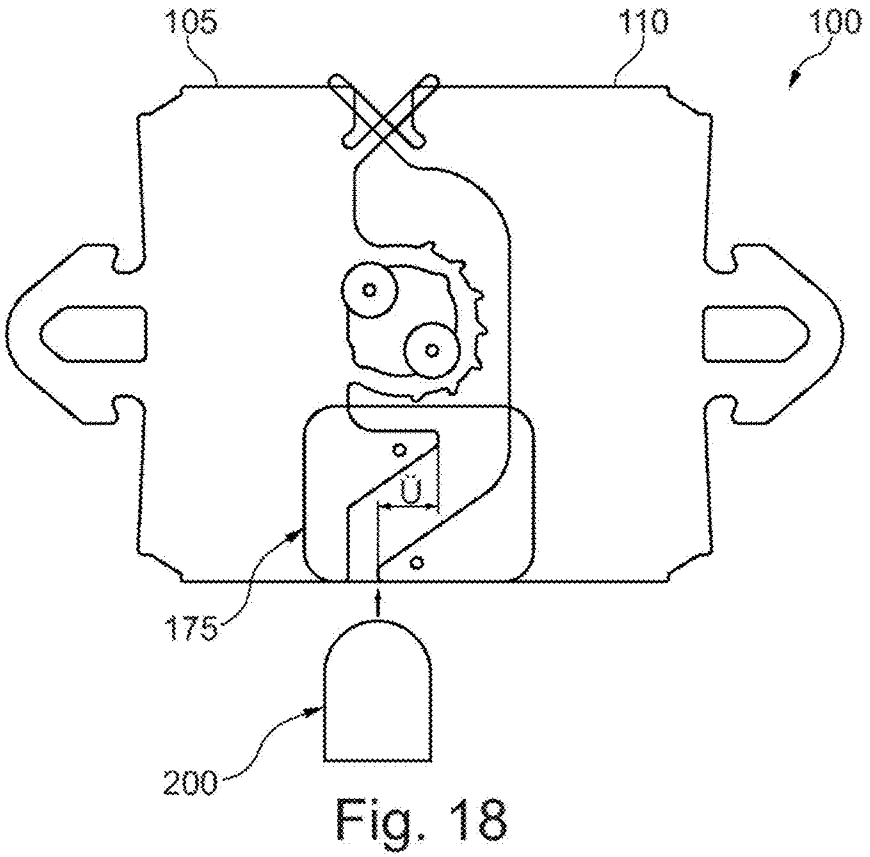
FIG. 18 shows a cross-section of a device according to an exemplary embodiment.

FIG. 18 shows a cross-section of a device 100 according to an exemplary embodiment for recognizing a movement of an object caught in a door of a vehicle. FIG. 18 shows an embodiment of the anti-vandalism element 175. This is an anti-vandalism mechanism protecting against actuation/penetration from the inside. For example, the case where an object 200, which can also be referred to as a vandalism body d20 mm, deforms the carrier elements 105, 110 with a maximum force of 200N such that a detection is triggered. The arrangement of the prong geometry of the anti-vandalism element 175 was defined in such a way that a minimum offset of +/−4 mm in the Y-direction can be compensated. The overlap (Ü) is selected in such a way that the value does not fall below 2 mm even if the carrier elements 105, 110 are subjected to minimum pressure.

Figure 19:
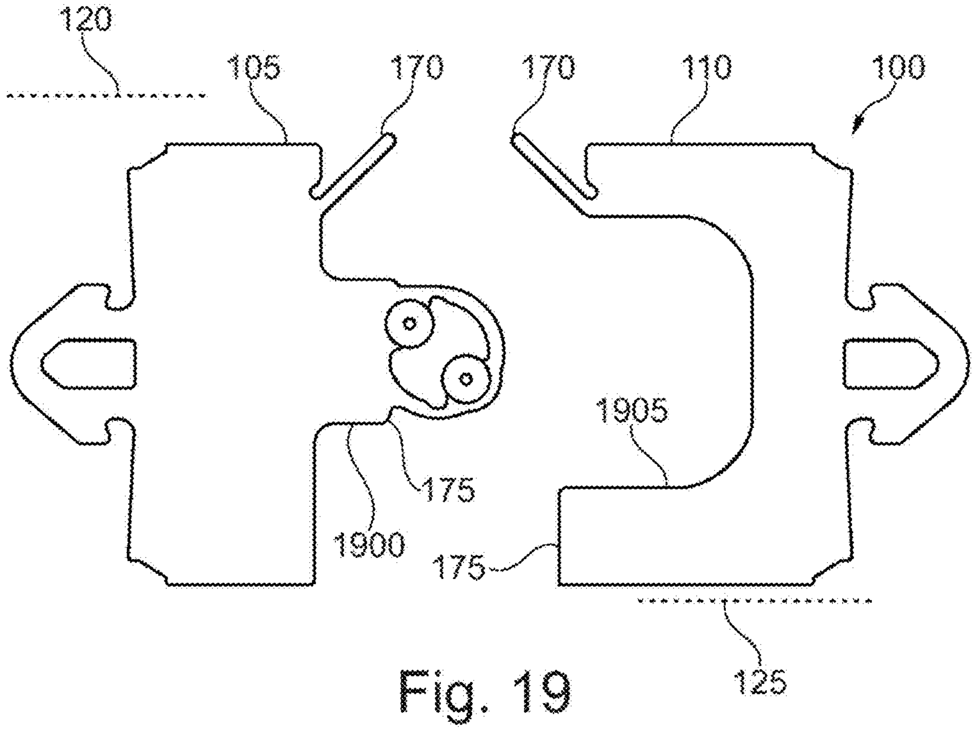
FIG. 19 shows a cross-section of a device according to an exemplary embodiment.

FIG. 19 shows a cross-section of a device 100 according to an exemplary embodiment for recognizing a movement of an object caught in a door of a vehicle. The device 100 in FIG. 19 includes a further protrusion 1900. The further protrusion 1900 is located on the carrier element 105. The further carrier element 110 has an extension 1905 in the direction of the inner side 125 of the door leaf, which extension is formed together with the further protrusion 1900 as an anti-vandalism element 175. In FIG. 19, the device 100 is in an open state.

Figure 20:
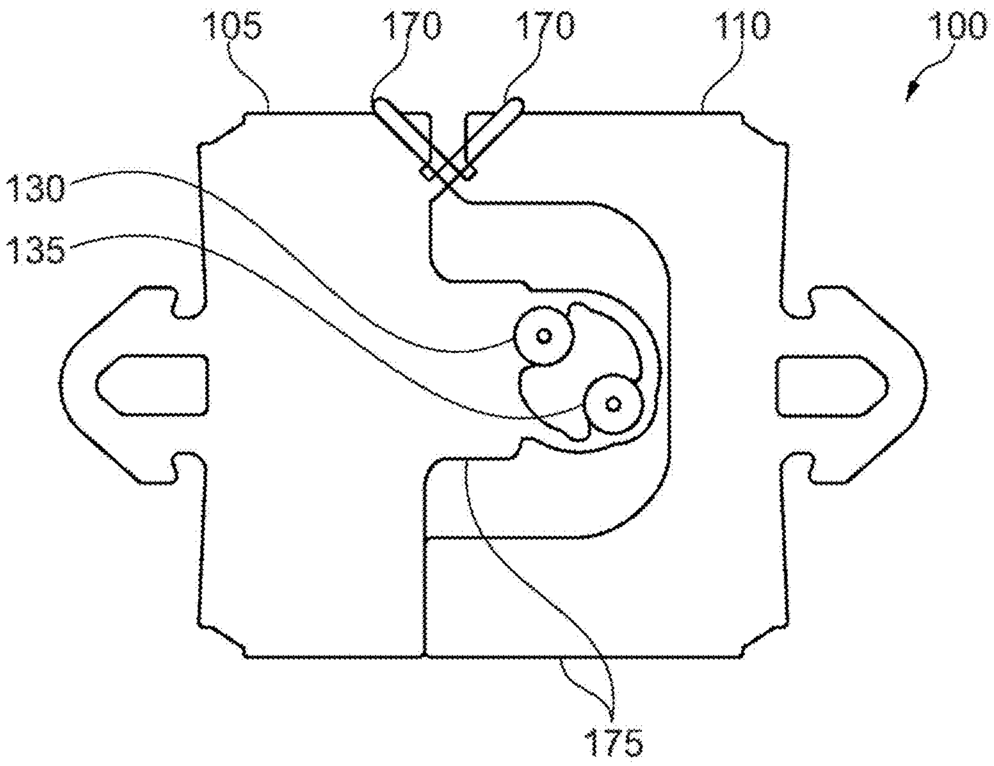
FIG. 20 shows a cross-section of a device according to an exemplary embodiment.

FIG. 20 shows a cross-section of a device 100 according to an exemplary embodiment for recognizing a movement of an object caught in a door of a vehicle. Here, FIG. 20 is an exemplary embodiment of FIG. 19. In FIG. 20, the device 100 is shown in a closed state of the door leaves. The anti-vandalism element 175 prevents detection of a pull on the object in the sensing direction caused by vandalism or damage to the device 100, since the first and second conductors 130, 135 are not contacted when an object penetrates from the inside or outside and are protected behind the anti-vandalism element 175.

Figure 21:
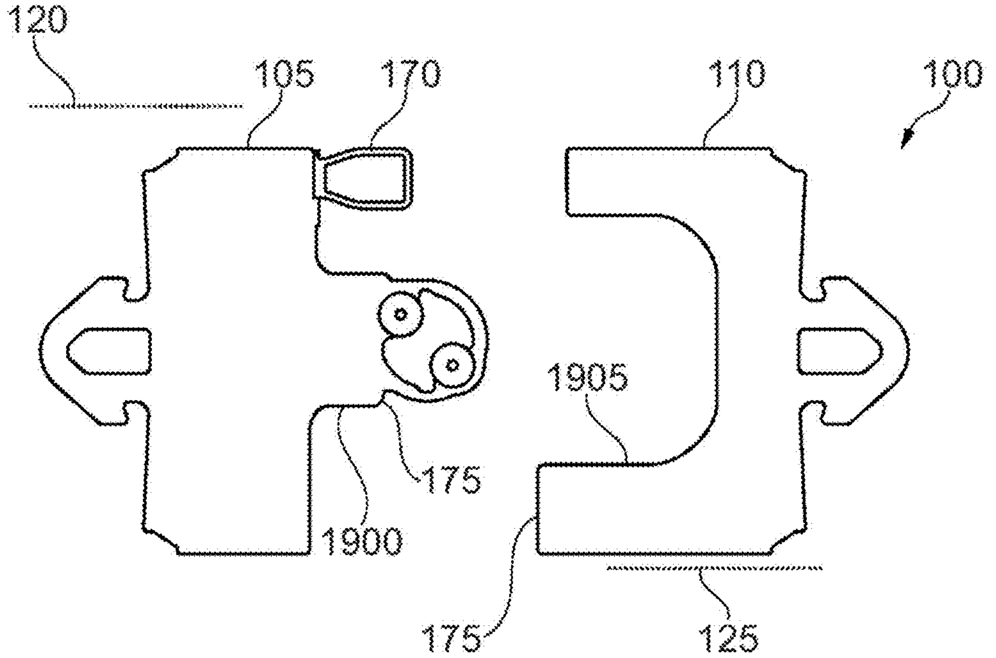
FIG. 21 shows a cross-section of a device according to an exemplary embodiment.

FIG. 21 shows a cross-section of a device 100 according to an exemplary embodiment for recognizing a movement of an object caught in a door of a vehicle. The device 100 in FIG. 19 is in an open state. The device 100 in FIG. 21 corresponds to the embodiment according to FIG. 19 or FIG. 20, but has a different shape of the sealing element 170 in the form of a balloon seal instead of a lip seal.

Such a solution for a sealing element can also provide a very good seal, especially also a good thermal insulation.

Figure 22:
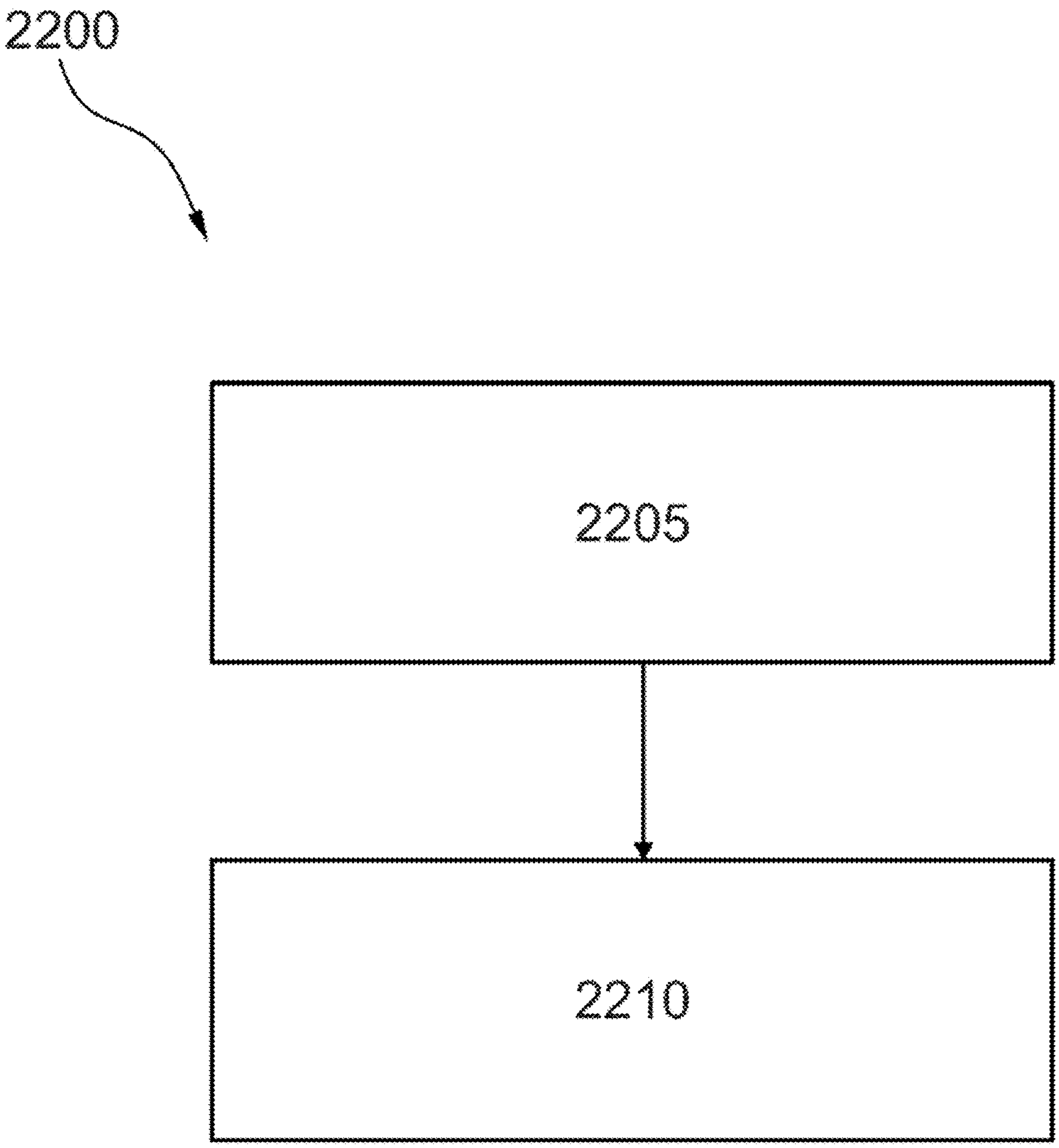
FIG. 22 shows a flowchart of an exemplary embodiment of a method for recognizing a movement of an object caught in a door of a vehicle.

FIG. 22 shows a flowchart of an exemplary embodiment of a method 2200 for recognizing a movement of an object caught in a door of a vehicle. The method 2200 includes an operation 2205 of detecting an electrical contact between the first conductor and the second conductor. In response to the operation 2105 of detecting the electrical contact, the method 2200 includes an operation 2210 of outputting a recognition signal for signaling the movement of the object caught in the door of the vehicle.

LIST OF REFERENCE SIGNS

100 device
101 door
102 detection system
103 vehicle
105 carrier element
110 further carrier element
115 attachment element
120 outer side of the door leaf
125 inner side of the door leaf
130 first electrical conductor
135 second electrical conductor
140 elastic object-contact element
145 cavity

150 sensing direction
155 balloon envelope
160 nub
163 buckling points
165 evaluation device
170 sealing element
175 anti-vandalism element
180 rubber width A
185 carrier element width B
200 object
900 protrusion
1000 third electrical conductor
1100 catch recognition element
1400 offset
1600 overlap
1700 swing-in motion
1900 further protrusion
1905 extension
2200 method for recognizing a movement of an object caught in a door of a vehicle
2205 detection operation
2210 outputting operation

The invention claimed is:

1. A device for recognizing a movement of an object caught in a door of a vehicle, the device comprising:

a carrier element, to which a first electrical conductor is fastened; and an elastic object-contact element, to which a second electrical conductor is fastened, wherein the elastic object-contact element forms a balloon envelope on the carrier element, the balloon envelope including raised nubs on an outer side configured to provide bearing between the object and the object-contact element, and the nubs define buckling points on an inner side of the object-contact element, wherein the elastic object-contact element is connected to the carrier element such that, when the caught object is pulled in a selected sensing direction, the first and second electrical conductors are contacted with each other, and when the caught object is pulled in an opposite direction to the selected sensing direction, the first and the second electrical conductor are not contacted with one another so that a recognition signal is only generated when the caught object is being pulled from outside the vehicle.

2. The device of claim 1, wherein the carrier element and the elastic object-contact element are formed in one piece.

3. The device of claim 1, wherein the first conductor and the second conductor are formed in a cavity, wherein the cavity is formed by the carrier element and the elastic object-contact element.

4. The device of claim 1, wherein the elastic object-contact element includes a switch tappet and/or protrusion, wherein the protrusion protrudes from the elastic object-contact element on a side thereof remote from the carrier element.

5. The device of claim 1, wherein the first conductor is upstream of the second conductor in the sensing direction, or wherein the second conductor is upstream of the first conductor in the sensing direction.

6. The device of claim 1, further comprising an anti-vandalism element located upstream of the elastic object-contact element in the sensing direction.

7. The device of claim 1, further comprising a sealing element downstream of the elastic object-contact element in the sensing direction.

8. The device of claim 1, further comprising a further electrical conductor fastened to the carrier element, wherein the first conductor is arranged in a region of a first end of the elastic object-contact element on the carrier element and the third conductor is arranged in a region of the elastic object-contact element on the carrier element opposite the first end.

9. The device of claim 1, further comprising a further carrier element having a recess so as to receive the elastic object-contact element in the recess.

10. The device of claim 1, further comprising a catch recognition element designed as a pressure sensor to recognize an object caught in the door of the vehicle, wherein the catch recognition element is embedded in the carrier element or in the further carrier element.

11. A detection system comprising:

a device for recognizing a movement of an object caught in a door of a vehicle, wherein the device includes a carrier element, to which a first electrical conductor is fastened, and an elastic object-contact element, to which a second electrical conductor is fastened, wherein the elastic object-contact element is connected to the carrier element, wherein the elastic object-contact element forms a balloon envelope on the carrier element, the balloon envelope including raised nubs on an outer side configured to provide bearing between the object and the object-contact element, and the nubs define buckling points on an inner side of the object-contact element such that, when the caught object is pulled in a selected sensing direction, the first and second electrical conductors are contacted with each other, and when the caught object is pulled in an opposite direction to the selected sensing direction, the first and the second electrical conductor are not contacted with one another; and an evaluation device designed to recognize a movement of the object caught in the door of the vehicle in the event of a recognized electrical contact between the first conductor and second conductor so that a recognition signal is only generated when the caught object is being pulled from outside the vehicle.

12. A method for recognizing a movement of an object caught in a door of a vehicle, wherein the method comprises:

detecting an electrical contact between a first conductor and a second conductor when a caught object is pulled in a selected sensing direction, and when the caught object is pulled in an opposite direction to the selected sensing direction, the first and the second electrical conductor are not contacted with one another;

wherein the detecting involves a carrier element, to which a first electrical conductor is fastened; and an elastic object-contact element, to which a second electrical conductor is fastened, wherein the elastic object-contact element forms a balloon envelope on the carrier element, the balloon envelope including raised nubs on an outer side configured to provide bearing between the object and the object-contact element, and the nubs define buckling points on an inner side of the object-contact element, and outputting a recognition signal for signaling the movement of the object caught in the door of the vehicle in response to the detection of the electrical contact so that the recognition signal is only generated when the caught object is being pulled from outside the vehicle.

13. A non-transitory computer program product comprising program code for performing and/or controlling the method of claim 12, when the computer program product is run on a device.

14. A machine readable storage medium on which there is stored the computer program of claim 13.

15. The method of claim 12, wherein the first conductor is upstream of the second conductor in the sensing direction, or wherein the second conductor is upstream of the first conductor in the sensing direction.

16. The method of claim 12, wherein an anti-vandalism element is located upstream of the elastic object-contact element in the sensing direction.

17. The method of claim 12, wherein a sealing element is located downstream of the elastic object-contact element in the sensing direction.

18. The method of claim 12, wherein a further electrical conductor is fastened to the carrier element, wherein the first conductor is arranged in a region of a first end of the elastic object-contact element on the carrier element and the third conductor is arranged in a region of the elastic object-contact element on the carrier element opposite the first end.

19. The method of claim 12, wherein a further carrier element has a recess so as to receive the elastic object-contact element in the recess.

20. The method of claim 12, wherein a catch recognition element is designed as a pressure sensor to recognize an object caught in the door of the vehicle, wherein the catch recognition element is embedded in the carrier element or in the further carrier element.

* * * * *